(12) United States Patent
Storry et al.

(10) Patent No.: US 7,672,325 B2
(45) Date of Patent: Mar. 2, 2010

(54) METHOD AND APPARATUS FOR IMPROVED IGMP GROUP MEMBERSHIP MESSAGING

(75) Inventors: Charles Michael Storry, Kemptville (CA); Frank Desseyn, Wortegem-Petegem (BE); Robert W. MacIntosh, Carp (CA)

(73) Assignee: Alcatel Lucent, Paris (FR)

( * ) Notice: Subject to any disclaimer, the term of this patent is extended or adjusted under 35 U.S.C. 154(b) by 524 days.

(21) Appl. No.: 11/604,724

(22) Filed: Nov. 28, 2006

(65) Prior Publication Data

US 2008/0123644 A1    May 29, 2008

(51) Int. Cl.
*H04L 12/56* (2006.01)
*H04J 1/16* (2006.01)

(52) U.S. Cl. .................. 370/412; 370/390; 370/419; 370/432

(58) Field of Classification Search ............ 370/390, 370/412, 419, 432
See application file for complete search history.

(56) References Cited

U.S. PATENT DOCUMENTS

| | | | |
|---|---|---|---|
| 6,370,142 B1 * | 4/2002 | Pitcher et al. | 370/390 |
| 6,594,703 B1 * | 7/2003 | Li | 709/235 |
| 6,633,765 B1 * | 10/2003 | Maggenti | 455/503 |
| 6,763,019 B2 * | 7/2004 | Mehta et al. | 370/352 |
| 7,009,967 B1 * | 3/2006 | Hariharasubrahmanian | 370/389 |
| 2007/0115963 A1 * | 5/2007 | Vadlakonda et al. | 370/389 |

OTHER PUBLICATIONS

Ixia, HLTAPI Commands, Release 2.80 Rev. B, Sep. 2006.*
Cisco, Cisco IOS-XR Multicast Command Reference, Cisco IOS-XR Software Release 2.0, 2004.*
Cain, et al., Internet Group Management Protocol, Version 3, MEMO, The Internet Society, Oct. 2002, Network Working Group, pp. 1-53.

* cited by examiner

*Primary Examiner*—John Pezzlo
(74) *Attorney, Agent, or Firm*—Kramer & Amado, PC

(57) ABSTRACT

A method and apparatus for controlling a Report message processing load at an IGMPv3 proxy/router. A <max_records> variable governs a number of current-state Group Records that can be sent in an IGMPv3 Report message in response to a General Membership Query (GMQ). The <max_records> variable may be provisioned in IGMPv3 hosts, or dynamically provided by the IGMPv3 proxy/routers, which embed the <max_records> variable in the GMQs.

13 Claims, 4 Drawing Sheets

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Type = 0x11  | Max Resp Code |           Checksum            |
   102              104              106
+-+-+-+-+-+-+-+-+-+-+-+-+-+-+-+-+-+-+-+-+-+-+-+-+-+-+-+-+-+-+-+-+
|                         Group Address                         |
   108
+-+-+-+-+-+-+-+-+-+-+-+-+-+-+-+-+-+-+-+-+-+-+-+-+-+-+-+-+-+-+-+-+
| Resv    |S| QRV |     QQIC      |     Number of Sources (N)   |
   110       112   114               116
+-+-+-+-+-+-+-+-+-+-+-+-+-+-+-+-+-+-+-+-+-+-+-+-+-+-+-+-+-+-+-+-+
111                      Source Address [1]                     |
+-                                                             -+
|                        Source Address [2]                     |
+-                                                             -+
.                               .                               .
.                               .                               .
+-                                                             -+
| 118                     Source Address [N]                    |
+-+-+-+-+-+-+-+-+-+-+-+-+-+-+-+-+-+-+-+-+-+-+-+-+-+-+-+-+-+-+-+-+
                                 ↑
                                  ↘
                                  100
```

FIG. 2
(Prior Art)

METHOD AND APPARATUS FOR IMPROVED IGMP GROUP MEMBERSHIP MESSAGING

CROSS-REFERENCE TO RELATED APPLICATIONS

This is the first application filed for the present invention.

MICROFICHE APPENDIX

Not Applicable.

TECHNICAL FIELD

The present invention relates in general to maintenance messaging required for the provision of Internet Protocol (IP) multicast services, and in particular to the provision of IP multicast service using Internet Group Membership Protocol version 3 (IGMPv3) with improved group membership messaging.

BACKGROUND OF THE INVENTION

The provision of IP multicast services has become increasingly important, especially in view of recent advances in the distribution of television signals over IP networks.

The group membership reporting functions and messages required for the provision of IP multicast services is governed by the Internet Group Membership Protocol (IGMP) standard. A new version of the standard (Version 3) described in RFC 3376 is currently being implemented. IGMPv3 can be used to provide IP television (IPTV) enhanced services.

FIG. 1 is a schematic diagram of an exemplary distribution network for providing IPTV service to service subscribers. A video head end receiver 10 receives a plurality of television signals associated with different television channels 12-16. A copy of each television signal is fed to a broadband service router (BSR) 18 using, for example, a statically configured link. The BSR 18 in turn sends one copy of each signal to a Broadband Service Aggregator (BSA) 20. Copies of each channel that is being consumed by a subscriber served by an access node, such as a digital subscriber line access multiplexer (DSLAM) 22a-22c, as indicated by IGMPv3 group membership messages (joins) sent from the DSLAMs 22a-22c to the BSA 20. Alternatively, consumed channels may be delivered directly to a DSLAM 22d. The DSLAMs 22a-22d receive IMGP group membership messages (joins) from subscriber premises residential gateways (RGs) 24a-24g or directly via a modem with a bridging function (not shown) from subscriber premises set top boxes (STBs) 26d and 26f. As will be understood by those skilled in the art, only a few residential gateways 24 and a few set top boxes 26 are shown for clarity.

The STBs 26 act as IGMP hosts. When a RG 24a-24g operates in routed mode, it supports an IGMP proxy function that acts as an IGMP router towards the STBs 26a-26c and 26e, and as an IGMP host towards the DSLAMs 22a, 22c and 22d. Each television signal (channel) is associated with a multicast group distributed on demand by the DSLAMs 22 to the RGs 24a-24g and/or the STBs 26d, 26f. The IGMP join messages indicate the IP multicast group(s) that the RGs 24 and/or the STBs 26d, 26f wish to join in response to commands input by IPTV viewers or automated STB functions.

As part of the evolution of IPTV services, the number of multicast streams supported by distribution equipment must be increased throughout the network. This is due to an increase in the number of channels being offered in IPTV networks, and by an increase in an average number of streams being consumed per STB, particularly since the introduction of IPTV mosaic features.

Not only does the increased number of multicast streams result in higher "zapping" (channel changing) concurrency, but also in a higher maintenance message load to support IGMP membership messaging. Two types of management messages are of particular importance to IGMP membership messaging, the Membership Query and the Membership Report.

FIG. 2 is a schematic diagram of the format of an IGMPv3 Membership Query message. Membership Queries are sent by IP multicast routers to query the multicast reception state of neighboring interfaces. The Type field 102 identifies the message as a membership query message. The Max Resp Code field 104 specifies a maximum time allowed before a membership report is to be sent by a receiver. The actual time allowed, called the Max Resp Time, is represented in units of $\frac{1}{10}$ second and is derived from the Max Resp Code as follows: If Max Resp Code<128, Max Resp Time=Max Resp Code; If Max Resp Code>=128, Max Resp Code represents a floating-point value as follows: Max Resp Time=(mant|0×10)<< (exp+3).

A Checksum 106 is a 16-bit one's complement of the one's complement sum of the whole IGMP message (the entire IP payload). A Group Address field 108 is set to zero when sending a General Membership Query. A Resv (reserved) field 110 is set to zero on transmission, and ignored on reception. An "S" Flag (Suppress Router-Side Processing) field 111, if set to '1' indicates to any receiving multicast routers that they are to suppress the normal timer updates they perform upon hearing a Query. If non-zero, a QRV field 112 contains the [Robustness Variable] value used by the querier, i.e., the sender of the Query. A Querier's Query Interval Code (QQIC) field 114 specifies a [Query Interval] used by the querier. A Number of Sources (N) field 116 specifies how many source addresses are present in the Query. This number is zero in a General Query or a Group-Specific Query, and non-zero in a Group-and-Source-Specific Query. The Source Address fields 118 are a vector of n IP unicast addresses, where n is a value in the Number of Sources (N) field 116.

While it will be appreciated by those skilled in the art that some management messaging enhancements are available in IGMPv3, a strict interpretation of the protocol can lead to increased peak message processing requirements, particularly within access nodes such as DSLAMs. For example, as explained above the query response interval coding (Max Resp Code 104) now allows for a larger range of values than permitted in IGMPv2 (maximum of 25 seconds). For proper operation of IGMPv3 membership messaging, the query response interval should be less than the query interval. The new Max Resp Code 104 supports values up to, and even greater than, the 125 second default query interval. Thus, a lengthened query response interval (up to the query interval) can be used to help distribute membership report message processing loads.

However, IGMPv3 recommends that membership report messages include multiple current-state Group Records up to maximum message size. This IGMPv3 record aggregation feature is helpful in expediting the join and leave processing using unsolicited membership reports when an event affects multiple groups simultaneously, eg. grid-guide scrolling. For General Membership Queries, however, while this aggregated IGMPv3 group solicited report reduces overall message load compared to IGMPv2, it can result in non-deterministic behavior resulting in bursty and lengthy message processing conditions when a large number of current-state Group Records are included in a single solicited IGMPv3 membership report.

RFC 3376 clearly states that a system must maintain a timer per interface for scheduling responses to a general membership query (GMQ). The RFC also indicates that this timer should assume a random value between 0 and a maximum response time derived from the Max Resp Code 104. RFC 3376 also specifies that multiple state records be packed into report messages to the extent possible (MTU limits restrict the maximum number of groups that may be reported in a single message). Therefore, upon expiry of the timer, a membership report message is sent that contains a current state record for each multicast address for which the host has a reception state (each multicast group that the host believes it has joined).

There is however a note in Section 5.2 of RFC 3376 that suggests that reporting on a large number of groups may result in a burst of packets if a larger number of groups are to be reported than will fit in a single report message. Specifically, RFC 3376 suggests that rather than using a single timer in such instances, report messages be spread over the interval 0 to maximum response time. However, RFC 3376 fails to provide an algorithm for accomplishing the message spreading.

There therefore remains a need for a method and apparatus for distributing the General Query Message processing load required for IGMPv3 membership maintenance.

SUMMARY OF THE INVENTION

It is an object of the invention to provide a method and apparatus for distributing the General Query Message processing load required for IGMPv3 membership maintenance.

The invention therefore provides a method for distributing an Internet Group Membership Protocol version 3 (IGMPv3) General Membership Query (GMQ) Report message processing load, comprising: provisioning an IGMPv3 host to compute a number of timers required to govern responses to a received GMQ by computing a number of current-state Group Records to be reported by a max_records number derived from a <max_records> variable made available to the IGMPv3 host; provisioning the IGMPv3 host to start the required number of timers by assigning each timer a random interval; and provisioning the IGMPv3 host to send a Report message each time a one of the timers expires, the Report message containing up to the max_records number of the current-state Group Records.

The invention further provides an Internet Group Membership Protocol version 3 (IGMPv3) host, comprising: program instructions that decode a <max_records> variable to derive a max_records number; program instructions that compute a number of General Membership Query (GMQ) response timers using a number of current-state Group Records to be reported divided by the max_records number; program instructions that start the computed number of response timers and assign each timer a random interval; and program instructions for inserting the max_records number of current-state Group Records into a Report message each time a one of the timers expires.

The invention yet further provides an Internet Group Membership Protocol version 3 (IGMPv3) Digital Subscriber Access Multiplexer (DSLAM) for serving a plurality of IGMPv3 hosts through a plurality of interfaces, comprising: program instructions that insert a <max_records> variable into each General Membership Query (GMQ) sent through each interface.

BRIEF DESCRIPTION OF THE DRAWINGS

Further features and advantages of the present invention will become apparent from the following detailed description, taken in combination with the appended drawings, in which:

FIG. 2 is a schematic diagram of a prior art IGMPv3 membership Query Message;

It should be noted that throughout the appended drawings, like features are identified by like reference numerals.

DETAILED DESCRIPTION OF PREFERRED EMBODIMENTS

The invention provides a method and apparatus for distributing a processing load required to process membership Report messages responsive to General Membership Queries (GMQ) issued by a proxy/router using IGMPv3 for multicast stream control.

In accordance with the method, a variable <max_records> is added to control the number of current-state Group Records inserted in each solicited Report message. The variable <max_records> may be manually provisioned in any IGMPv3 host, or may be dynamically assigned by a proxy/router which embeds the variable in the GMQs.

When a GMQ is received, the number of current-state Group Records to be reported is divided by a max_records number derived from the <max_records> variable, to determine the number of timers needed to control the required Report messages. The required number of timers is started, each being assigned a random value between 0 and max_response_time. As each timer expires, a Report message containing up to the max_records number of current-state Group Records is sent to the proxy/router. This ensures that the Report message processing load is distributed at the proxy/router.

Only GMQ Reports are affected by the method. When a state has changed on multiple multicast addresses, unsolicited report messages containing aggregated multiple groups are sent in accordance with the standard behavior.

Figure 1:
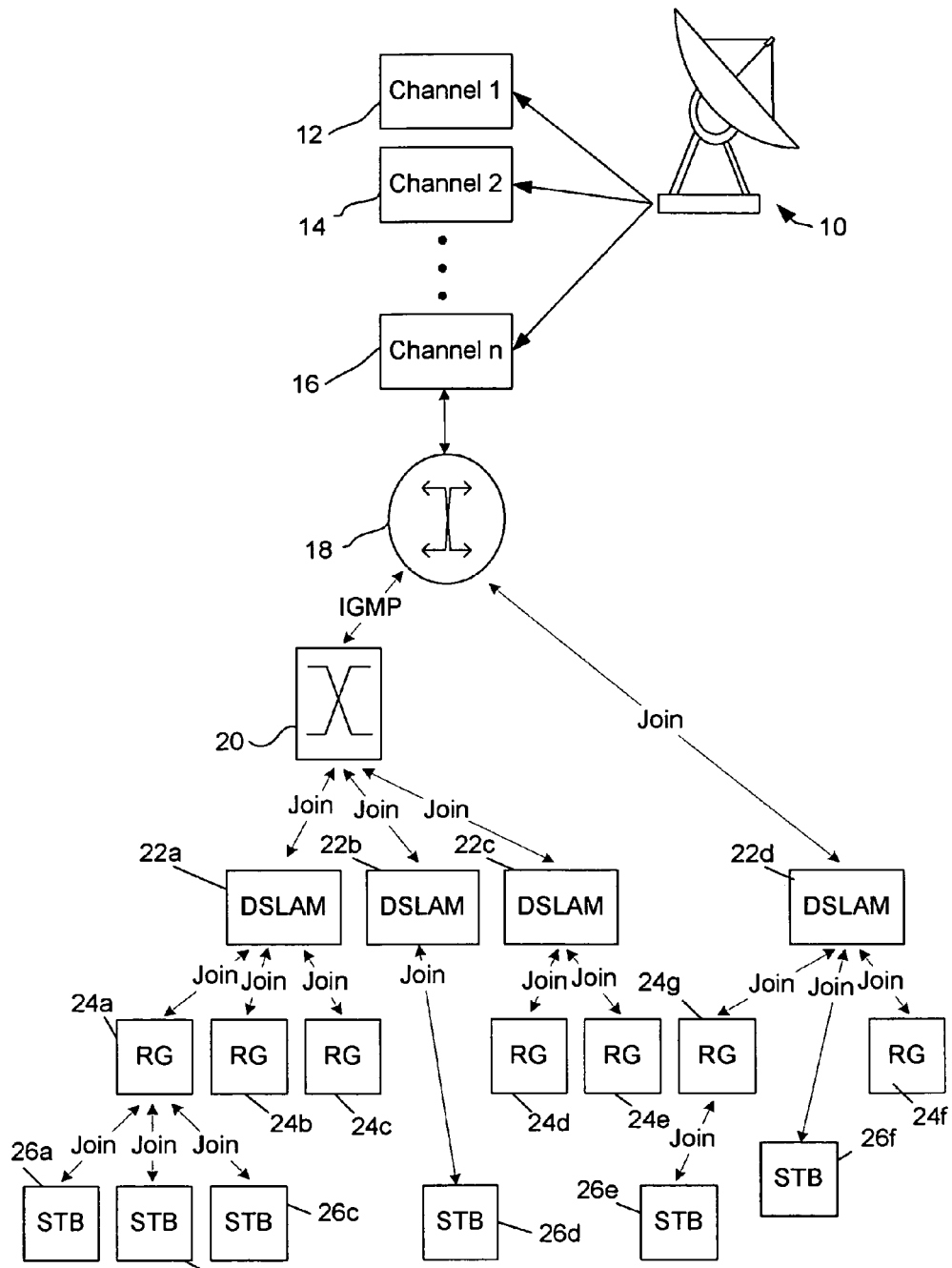
FIG. 1 is a schematic diagram of a prior art network configuration for providing IPTV service to service subscribers.
Figure 3:
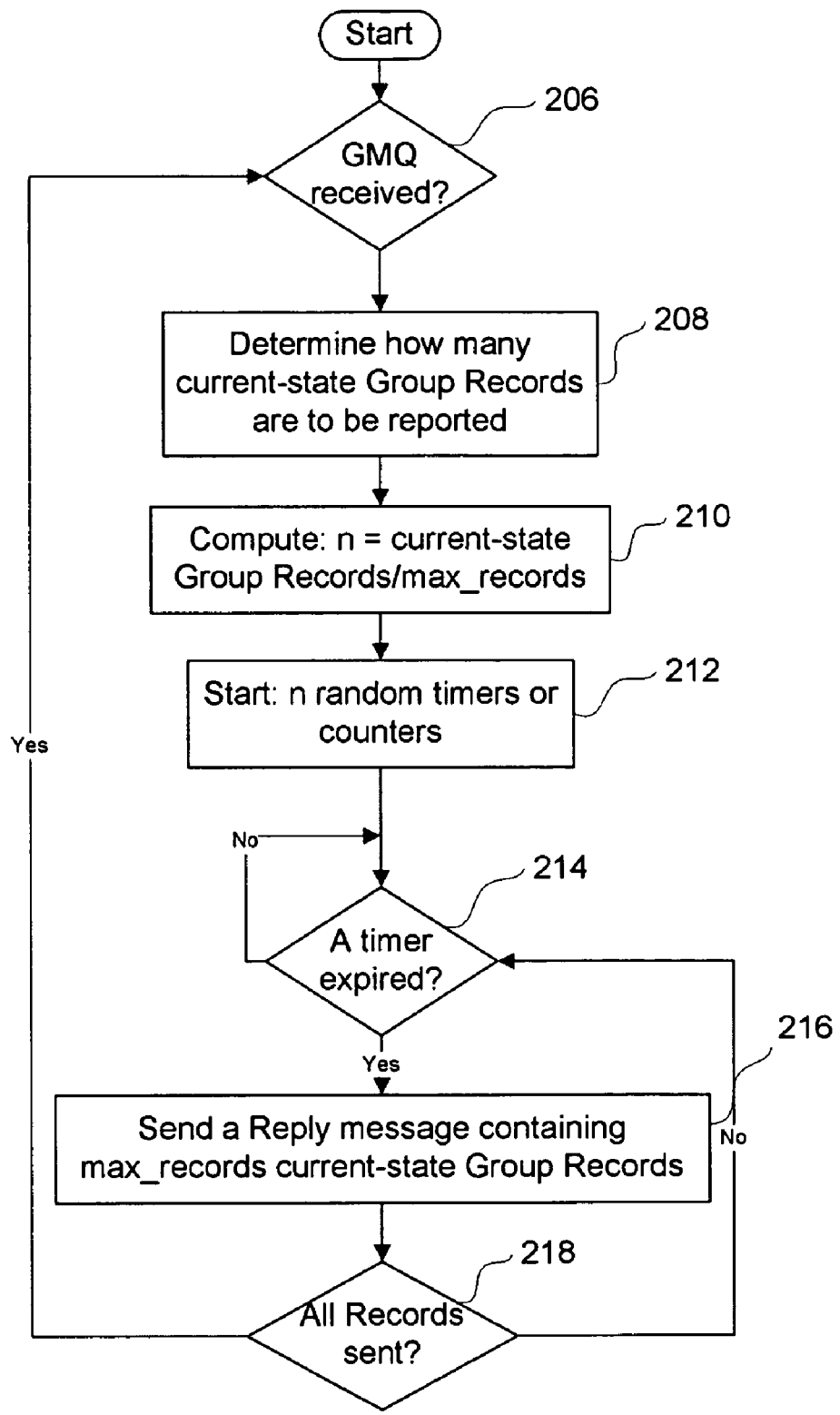
FIG. 3 is a flow chart illustrating a method in accordance with the invention.

FIG. 3 is a flow chart illustrating the method in accordance with a first embodiment of the invention. In accordance with this embodiment, when an IGMPv3 host (RG 24 or STB 26, see FIG. 1) receives a GMQ (206) it determines how many current-state Group Records are to be reported (208). The host then executes program instructions that compute a number of timers needed for membership Report(s) required to respond to the GMQ. The program instructions divide the number of current-state Group Records by a max_records number derived from a provisioned variable <max_records> to compute a number of timers "n" (210). If "n" is not an integer, "n" is rounded up to the nearest integer. The host then starts the "n" random timers (212). Alternatively, "n" random counters may be used for the same purpose. The IGMPv3 host then monitors the timers to determine when one of the timers has expired (214). When one of the timers has expired, the IGMPv3 host sends a Report message containing up to max_records current-state Group Records (216). The IGMPv3 host then determines whether all current-state Group Records have been reported (218). If it is determined that all of the current-state Group Records have not been reported, the process returns to 214. Otherwise, the process returns to 206. Of course, as will be understood by those skilled in the art, the number of current-state Group Records may change during a query reply interval due to channel changing. Consequently, the current-state Group Records are dynamically maintained at all times by the IGMPv3 host. However, this activity has no bearing on the operations of method in accordance with the invention.

As will be understood by those skilled in the art, the <max_records> variable may be provisioned by a manufacturer of the host, or provisioned by an installer or by network management personnel. The <max_records> variable may be stored in a memory as a binary, or floating point number, or as a code that is converted to the max_records number using an algorithm, a look-up table, or the like. Other encoding/decoding algorithms, as described below in more detail with reference to FIG. 4 can also be used.

Figure 4:
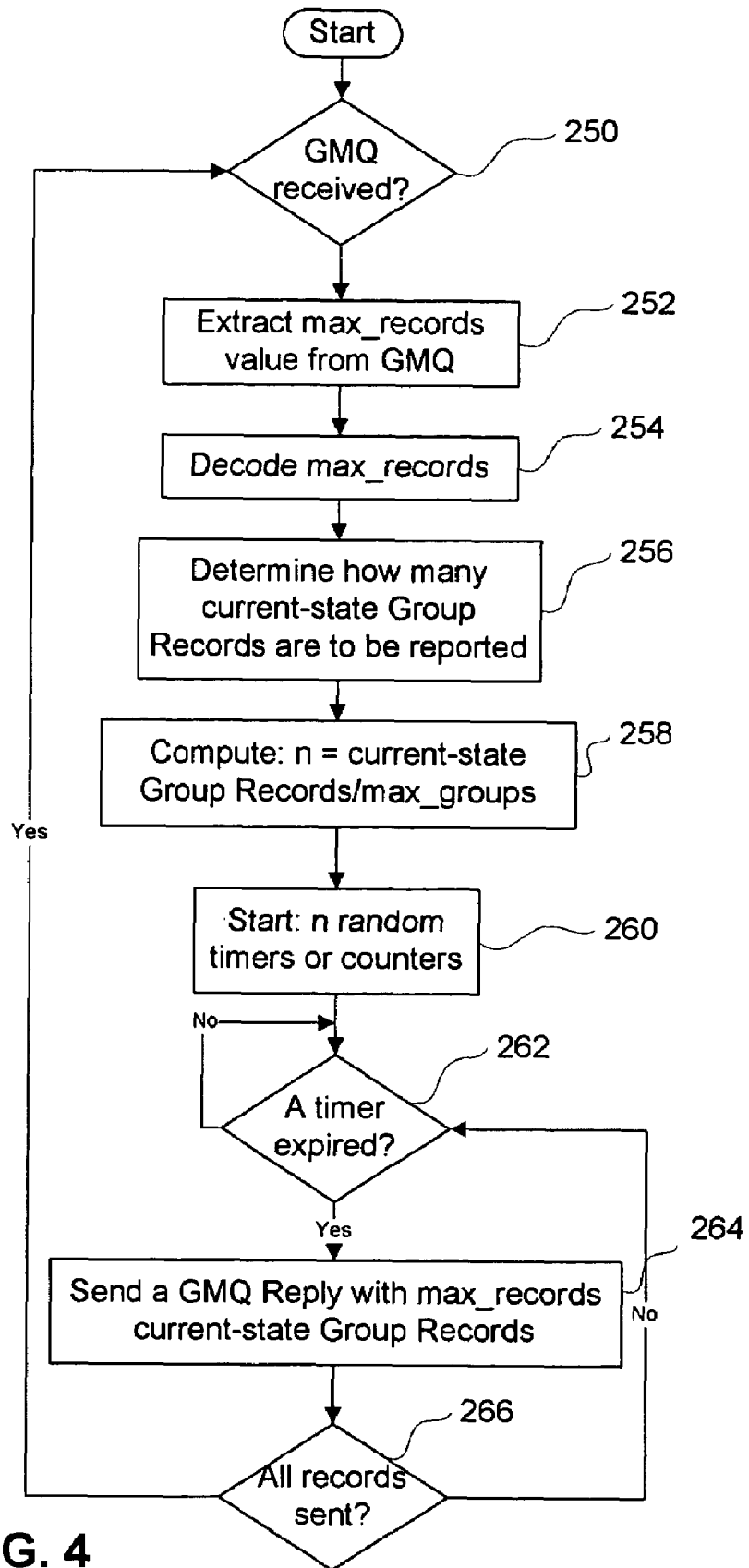
FIG. 4 is a flow chart illustrating another embodiment of the method in accordance with the invention.

FIG. 4 is a flow chart illustrating another embodiment of the method in accordance with the invention. As shown in FIG. 4, when a GMQ is received (250), the IGMPv3 host examines the GMQ and extracts the variable <max_records> embedded in the GMQ by the proxy/router that sent the GMQ. In accordance with one embodiment of the invention, the variable <max_records> is stored in the Resv field 110 (see FIG. 2) of the GMQ.

The Resv field 110 is 4 bits long. It can therefore be populated with a binary value in the range of 0-15 that is decoded in accordance with an algorithm for deriving the max_records number from the <max_records> variable. In accordance with one embodiment of the invention, a value of "0" means no limit on the number of current-state Group Records that can be sent in a single Report message (i.e. the default behavior in accordance with RFC 3376). A value of "1" means 2 to the power of 1=2 current-state Group Records are permitted to be inserted in each Report message; a value of a "2" means 2 to the power of 2=4 current-state Group Records can be inserted in each Report message; etc.

As will be understood by those skilled in the art, other algorithms can also be used for deriving the max_records number from the <max_records> variable. For example, the four-bit Resv field 110 could be stored as a binary number having the values 0-15, and the decoded value of the field used to indicate the max_records number of current-state Group Records that are permitted to be inserted in any Report message. As above, a value of "0000" indicates the RFC 3376 standard, i.e. no limit up to maximum message size. However, "0001" indicates that 1 current-state Group Record can be inserted in each Report message; "0010" indicates that up to 2 current-state Group Records can be sent in each Report message; "0011" indicates that up to 3 current-state Group Records can be sent in each Report message; etc.

After the IGMPv3 host has extracted the <max_records> variable from the Resv field 110 of the GMQ 100 (252), the max_records number is derived from the <max_records> variable (254) using an algorithm, such as one of the algorithms described above. The IGMPv3 host then determines how many current-state Group Records are to be reported (256). A variable "n" is computed by dividing the number of current-state Group Records by the max_records number (258). The IGMPv3 host starts the "n" random timers (260) and monitors the timers to determine when one of the timers has expired. When a timer expires (262), the IGMPv3 host sends a Report message with up to max_number of current-state Group Records in the Report message (264). The IGMPv3 host then determines if all current-state Group Records have been reported (266). If not, the IGMPv3 host returns to monitoring the timers (262). Otherwise, the IGMPv3 host returns (250) to await receipt of another GMQ.

As will be understood by those skilled in the art, an IGMPv3 proxy/router (DSLAM 22 or RG 24) can be provisioned with a <max_records> variable per interface. Alternatively, the IGMPv3 router may be provisioned with an algorithm for dynamically assigning a <max_records> variable to each interface based on current processing load, time of day, or any other appropriate criteria.

The embodiments of the invention described above are intended to be exemplary only. The scope of the invention is therefore intended to be limited solely by the scope of the appended claims.

We claim:

1. A method of distributing an Internet Group Membership Protocol version 3 (IGMPv3) General Membership Query (GMQ) Report message processing load, comprising:
   receiving a GMQ with an IGMPv3 host;
   extracting, with the IGMPv3 host, a <$max_{13}$ records> variable from the GMQ;
   deriving with the IGMPv3 host, a max records number from the <$max_{13}$ records> variable;
   determining, with the IGMPv3 host, a number of current-state Group Records;
   computing, with the IGMPv3 host, a required number of timers to respond to the GMQ by dividing the number of current-state Group Records by the max records number;
   starting, with the IQMPv3 host, the required number of timers, wherein each timer has a random interval before expiration; and
   sending, with the IGMPv3 host, a Report message upon expiration of each timer, the Report message containing up to the $max_{13}$ records number of the current-state Group Records.

2. The method as claimed in claim 1, wherein the deriving step further comprises:
   computing, with the IGMPv3 host, $2^n$, where 'n' is a value of the <$max_{13}$ records> variable, to derive the $max_{13}$ records number.

3. The method as claimed in claim 1, wherein the deriving step further comprises:
   using, in the IGMPv3 host, a value of the <$max_{13}$ records> variable as the $max_{13}$ records number.

4. The method as claimed in claim 1 wherein the deriving step further comprises:
   inserting, with the IGMPv3 proxy/router, the <$max_{13}$ records> variable into the GMQ.

5. The method as claimed in claim 4 wherein the inserting step further comprises:
   inserting, with the IGMPv3 proxy/router, the <$max_{13}$ records> variable into a Resv field of the GMQ.

6. A computer readable medium including computer program instructions that when executed by a computer distribute an Internet Group Membership Protocol version 3 (IGMPv3) General Membership Query (GMQ) Report message processing load in an Internet Group Membership Protocol version 3 (IGMPv3) host, comprising:
   program instructions, in the IGMPv3 host, that derive a $max_{13}$ records number from a <$max_{13}$ records> variable;
   program instructions, in the IGMPv3 host, that compute a number of General Membership Query (GMQ) response timers by dividing a number of current-State Group Records by the $max_{13}$ records number;
   program instructions, in the IGMPv3 host, that start the computed number of response timers and assign a random interval before expiration to each timer; and program instructions, in the IGMPv3 host, that insert the $Max_{13}$ records number of the current-state Group Records into a Report message upon expiration of each timer.

7. The computer readable medium as claimed in claim 6, further comprising:
program instructions, in the IGMPv3 host, that extract the <$max_{13}$ records> variable from the GMQ.

8. The computer readable medium as claimed in claim 7, wherein program instructions, in the IGMPv3 host, extract the <$max_{13}$ records> variable from the Resv field of the GMQ.

9. The computer readable medium as claimed in claim 6, wherein program instructions, in the IGMPv3 host, compute $2^n$, where 'n' is a value of the <$max_{13}$ records> variable, to derive the $max_{13}$ records number.

10. The computer readable medium as claimed in claim 6, wherein program instructions, in the IGMPv3 host, determine a binary value of the <$max_{13}$ records> variable to derive the $max_{13}$ records number.

11. A computer readable medium including computer program instructions that when executed by a computer serve a plurality of Internet Group Membership Protocol version 3 (IGMPv3) hosts through a plurality of interfaces in an Internet Group Membership Protocol version 3 (IGMPv3) Digital Subscriber Access Multiplexer (DSLAM), comprising:
program instructions, in the IGMPv3 hosts, that derive a max records number from a <$max_{13}$ records> variable;
program instructions, in the IGMPv3 hosts, that compute a number of General Membership Query (GMQ) response timers by dividing a number of current-state Group Records b the max records number;
program instructions, in the IGMPv3 hosts, that start the computed number of response timers and assign a random interval before expiration to each timer; and
program instructions, in the IGMPv3 hosts, that insert the $max_{13}$ records number of the current-state Group Records into a Report message upon expiration of each timer.

12. The computer readable medium as claimed in claim 11, wherein program instructions, in the IGMPv3 hosts, insert the <$max_{13}$ records> variable in a Resv field of each of the plurality of GMQs.

13. The computer readable medium as claimed in claim 11, wherein program instructions, in the IGMPv3 hosts, retrieve a different <$max_{13}$ records> variable for each of the plurality of interfaces.

* * * * *

UNITED STATES PATENT AND TRADEMARK OFFICE
CERTIFICATE OF CORRECTION

PATENT NO. : 7,672,325 B2  Page 1 of 1
APPLICATION NO. : 11/604724
DATED : March 2, 2010
INVENTOR(S) : Charles Michael Storry, Frank Desseyn and Robert W. MacIntosh It is certified that error appears in the above-identified patent and that said Letters Patent is hereby corrected as shown below:

Claim 1, line 5, change "<max$_{13}$records>" to "<max_records>";
  line 7, change "max records" to "max_records";
  line 8, change "<max$_{13}$records>" to "<max_records>";
  line 13, change "max records" to "max_records";
  line 20, change "<max$_{13}$records>" to "<max_records>".
Claim 2, line 4, change "<max$_{13}$records>" to "<max_records>";
  lines 4 and 5, change "<max$_{13}$records>" to "<max_records>".
Claim 3, line 3, change "<max$_{13}$records>" to "<max_records>";
  line 4, change "<max$_{13}$records>" to "<max_records>".
Claim 4, lines 3 and 4, change "<max$_{13}$records>" to "<max_records>".
Claim 5, lines 3 and 4, change "<max$_{13}$records>" to "<max_records>".
Claim 6, line 8, change "max13records" to "max_records" and change "<max$_{13}$records>" to "<max_records>";
  line 11, change "current-State" to "current-state";
  line 12, change "max$_{13}$records" to "max_records";
  line 17, change "Max13records" to "max_records".
Claim 7, line 4, change "<max$_{13}$records>" to "<max_records>".
Claim 8, line 3, change "<max$_{13}$records>" to "<max_records>".
Claim 9, line 3, change "<max$_{13}$records>" to "<max_records>";
  line 4, change "max$_{13}$records" to "max_records".
Claim 10, line 3, change "<max$_{13}$records>" to "<max_records>";
  line 4, change "max$_{13}$records" to "max_records".
Claim 11, line 8, change "max records" to "max_records" and change "<max$_{13}$records>" to "<max_records>";
  line 12, change "b" to "by" and change "max records" to "max_records";
  line 17, change "max$_{13}$records" to "max_records".
Claim 12, line 3, change "<max$_{13}$records>" to "<max_records>".
Claim 13, line 3, change "<max$_{13}$records>" to "<max_records>".

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,672,325 B2 Page 1 of 1
APPLICATION NO. : 11/604724
DATED : March 2, 2010
INVENTOR(S) : Charles Michael Storry, Frank Desseyn and Robert W. MacIntosh It is certified that error appears in the above-identified patent and that said Letters Patent is hereby corrected as shown below:

Column 6, Claim 1, line 19, change "<max$_{13}$records>" to "<max_records>";
  line 21, change "max records" to "max_records";
  line 22, change "<max$_{13}$records>" to "<max_records>";
  line 27, change "max records" to "max_records";
  line 34, change "<max$_{13}$records>" to "<max_records>".
Column 6, Claim 2, line 39, change "<max$_{13}$records>" to "<max_records>";
  lines 39 and 40, change "<max$_{13}$records>" to "<max_records>".
Column 6, Claim 3, line 43, change "<max$_{13}$records>" to "<max_records>";
  line 44, change "<max$_{13}$records>" to "<max_records>".
Column 6, Claim 4, lines 47 and 48, change "<max$_{13}$records>" to "<max_records>".
Column 6, Claim 5, lines 51 and 52, change "<max$_{13}$records>" to "<max_records>".
Column 6, Claim 6, line 60, change "max13records" to "max_records" and change "<max$_{13}$records>" to "<max_records>";
  line 63, change "current-State" to "current-state";
  line 64, change "max$_{13}$records" to "max_records";
Column 7, Claim 6, line 2, change "Max13records" to "max_records".
Column 7, Claim 7, line 8, change "<max$_{13}$records>" to "<max_records>".
Column 7, Claim 8, line 11, change "<max$_{13}$records>" to "<max_records>".
Column 7, Claim 9, line 15, change "<max$_{13}$records>" to "<max_records>";
  line 16, change "max$_{13}$records" to "max_records".
Column 7, Claim 10, line 19, change "<max$_{13}$records>" to "<max_records>";
  line 20, change "max$_{13}$records" to "max_records".
Column 8, Claim 11, line 4, change "max records" to "max_records" and change "<max$_{13}$records>" to "<max_records>";
  line 8, change "b" to "by" and change "max records" to "max_records";
  line 13, change "max$_{13}$records" to "max_records".
Column 8, Claim 12, line 18, change "<max$_{13}$records>" to "<max_records>".
Column 8, Claim 13, line 23, change "<max$_{13}$records>" to "<max_records>".

This certificate supersedes the Certificate of Correction issued April 20, 2010.

Signed and Sealed this

Eleventh Day of May, 2010

David J. Kappos
*Director of the United States Patent and Trademark Office*